(12) United States Patent
Reddy et al.

(10) Patent No.: US 7,284,608 B2
(45) Date of Patent: *Oct. 23, 2007

(54) CASING STRINGS AND METHODS OF USING SUCH STRINGS IN SUBTERRANEAN CEMENTING OPERATIONS

(75) Inventors: B. Raghava Reddy, Duncan, OK (US); Anthony M. Badalamenti, Katy, TX (US); Simon Turton, Kingwood, TX (US); Karl W. Blanchard, Cypress, TX (US); Ronald R. Faul, Katy, TX (US); Michael G. Crowder, Orlando, OK (US); Henry E. Rogers, Duncan, OK (US); James E. Griffith, Loco, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 306 days.

This patent is subject to a terminal disclaimer.

(21) Appl. No.: 10/973,331

(22) Filed: Oct. 26, 2004

(65) Prior Publication Data

US 2006/0086502 A1    Apr. 27, 2006

(51) Int. Cl.
 *E21B 33/14* (2006.01)
 *E21B 33/16* (2006.01)
 *E21B 17/00* (2006.01)

(52) U.S. Cl. .................. 166/291; 106/DIG. 1; 166/207; 166/242.1; 166/292; 166/293; 166/294; 166/300; 166/902; 507/269; 507/277; 507/928

(58) Field of Classification Search ................ 166/207, 166/242.1, 285, 291–294, 300, 376, 902; 106/819, 823, DIG. 1; 507/207, 231, 244, 507/265, 269, 273, 277, 928

See application file for complete search history.

(56) References Cited

U.S. PATENT DOCUMENTS 2,223,509 A    12/1940    Brauer
2,230,589 A    2/1941    Driscoll (Continued)

FOREIGN PATENT DOCUMENTS

EP    0 419 281 A2    3/1991

(Continued)

OTHER PUBLICATIONS

Foreign communication from related counter part appliation dated Dec. 9, 2005.

(Continued)

*Primary Examiner*—George Suchfield
(74) *Attorney, Agent, or Firm*—John W. Wustenberg; Baker Botts, L.L.P.

(57) ABSTRACT

Improved casing strings, and methods of using improved casing strings in subterranean operations, are provided. An example of a method is a method of cementing a pipe string in a subterranean formation. Another example of a method is a method of cementing a pipe string in a well bore. An example of an apparatus is an improved pipe string comprising at least one pipe section; and a delivery system of an activator; wherein the delivery system of an activator is disposed adjacent an outer surface of the at least one pipe section.

75 Claims, 5 Drawing Sheets

U.S. PATENT DOCUMENTS

| | | | |
|---|---|---|---|
| 2,407,010 A | 9/1946 | Hudson | |
| 2,472,466 A | 6/1949 | Counts et al. | |
| 2,647,727 A | 8/1953 | Edwards | 255/28 |
| 2,675,082 A | 4/1954 | Hall | 166/22 |
| 2,849,213 A | 8/1958 | Failing | |
| 2,919,709 A | 1/1960 | Schwegman | 137/68 |
| 3,051,246 A | 8/1962 | Clark, Jr. et al. | 166/226 |
| 3,110,347 A * | 11/1963 | Howard et al. | 166/285 |
| 3,193,010 A | 7/1965 | Bielstien | |
| 3,277,962 A | 10/1966 | Flickinger et al. | 166/15 |
| 3,948,322 A | 4/1976 | Baker | 166/289 |
| 3,948,588 A | 4/1976 | Curington et al. | |
| 3,951,208 A | 4/1976 | Delano | 166/78 |
| 4,105,069 A | 8/1978 | Baker | 166/51 |
| 4,271,916 A | 6/1981 | Williams | |
| 4,300,633 A | 11/1981 | Stewart | 166/250 |
| RE31,190 E | 3/1983 | Detroit et al. | 166/293 |
| 4,469,174 A | 9/1984 | Freeman | |
| 4,519,452 A | 5/1985 | Tsao et al. | |
| 4,531,583 A | 7/1985 | Revett | 166/253 |
| 4,548,271 A | 10/1985 | Keller | 166/291 |
| 4,555,269 A | 11/1985 | Rao et al. | 525/130 |
| 4,671,356 A | 6/1987 | Barker et al. | |
| 4,676,832 A | 6/1987 | Childs et al. | 106/730 |
| 4,791,988 A | 12/1988 | Trevillion | |
| 4,961,465 A | 10/1990 | Brandell | |
| 5,024,273 A | 6/1991 | Coone et al. | 166/289 |
| 5,117,910 A | 6/1992 | Brandell et al. | |
| 5,125,455 A | 6/1992 | Harris et al. | |
| 5,133,409 A | 7/1992 | Bour et al. | 166/293 |
| 5,147,565 A | 9/1992 | Bour et al. | 252/8.551 |
| 5,188,176 A | 2/1993 | Carpenter | 166/285 |
| 5,213,161 A | 5/1993 | King et al. | |
| 5,273,112 A | 12/1993 | Schultz | |
| 5,297,634 A | 3/1994 | Loughlin | 166/387 |
| 5,318,118 A | 6/1994 | Duell | |
| 5,323,858 A | 6/1994 | Jones et al. | |
| 5,343,951 A * | 9/1994 | Cowan et al. | 166/293 |
| 5,361,842 A | 11/1994 | Hale et al. | |
| 5,484,019 A | 1/1996 | Griffith | |
| 5,494,107 A | 2/1996 | Bode | 166/285 |
| 5,507,345 A | 4/1996 | Wehunt, Jr. et al. | 166/285 |
| 5,559,086 A | 9/1996 | Dewprashad et al. | |
| 5,571,281 A | 11/1996 | Allen | |
| 5,577,865 A | 11/1996 | Manrique et al. | |
| 5,641,021 A | 6/1997 | Murray et al. | |
| 5,647,434 A | 7/1997 | Sullaway et al. | |
| 5,671,809 A | 9/1997 | McKinzie | |
| 5,700,767 A * | 12/1997 | Adams | 508/539 |
| 5,718,292 A | 2/1998 | Heathman et al. | |
| 5,738,171 A | 4/1998 | Szarka | |
| 5,749,418 A | 5/1998 | Mehta et al. | |
| 5,762,139 A | 6/1998 | Sullaway et al. | 166/291 |
| 5,803,168 A | 9/1998 | Lormand et al. | |
| 5,829,526 A | 11/1998 | Rogers et al. | |
| 5,875,844 A | 3/1999 | Chatterji et al. | |
| 5,890,538 A | 4/1999 | Beirute et al. | 166/285 |
| 5,897,699 A | 4/1999 | Chatterji et al. | 106/678 |
| 5,900,053 A | 5/1999 | Brothers et al. | |
| 5,913,364 A | 6/1999 | Sweatman | |
| 5,968,255 A | 10/1999 | Mehta et al. | |
| 5,972,103 A | 10/1999 | Mehta et al. | |
| 6,060,434 A | 5/2000 | Sweatman et al. | |
| 6,063,738 A | 5/2000 | Chatterji et al. | 507/269 |
| 6,098,710 A | 8/2000 | Rhein-Knudsen et al. | 166/285 |
| 6,138,759 A | 10/2000 | Chatterji et al. | 166/293 |
| 6,143,069 A | 11/2000 | Brothers et al. | |
| 6,167,967 B1 | 1/2001 | Sweatman | |
| 6,196,311 B1 | 3/2001 | Treece et al. | 166/192 |
| 6,204,214 B1 | 3/2001 | Singh et al. | |
| 6,244,342 B1 | 6/2001 | Sullaway et al. | 166/285 |
| 6,258,757 B1 | 7/2001 | Sweatman et al. | |
| 6,311,775 B1 | 11/2001 | Allamon et al. | 166/285 |
| 6,318,472 B1 | 11/2001 | Rogers et al. | |
| 6,367,550 B1 | 4/2002 | Chatterji et al. | 166/293 |
| 6,431,282 B1 | 8/2002 | Bosma et al. | |
| 6,454,001 B1 | 9/2002 | Thompson et al. | |
| 6,457,524 B1 | 10/2002 | Roddy | |
| 6,467,546 B2 | 10/2002 | Allamon et al. | 166/381 |
| 6,481,494 B1 | 11/2002 | Dusterhoft et al. | 166/51 |
| 6,484,804 B2 | 11/2002 | Allamon et al. | 166/291 |
| 6,488,088 B1 | 12/2002 | Kohli et al. | 166/285 |
| 6,488,089 B1 | 12/2002 | Bour et al. | |
| 6,488,763 B2 | 12/2002 | Brothers et al. | |
| 6,540,022 B2 | 4/2003 | Dusterhoft et al. | 166/278 |
| 6,622,798 B1 | 9/2003 | Rogers et al. | |
| 6,666,266 B2 | 12/2003 | Starr et al. | |
| 6,666,268 B2 * | 12/2003 | Griffith et al. | 166/292 |
| 6,732,797 B1 | 5/2004 | Watters et al. | 166/291 |
| 6,758,281 B2 | 7/2004 | Sullaway et al. | |
| 6,802,374 B2 | 10/2004 | Edgar et al. | |
| 6,808,024 B2 | 10/2004 | Schwendemann et al. | |
| 6,810,958 B2 | 11/2004 | Szarka et al. | |
| 2003/0000704 A1 | 1/2003 | Reynolds | 166/312 |
| 2003/0029611 A1 | 2/2003 | Owens | 166/250.03 |
| 2003/0072208 A1 | 4/2003 | Rondeau et al. | |
| 2003/0192695 A1 | 10/2003 | Dillenbeck et al. | 166/285 |
| 2004/0079553 A1 | 4/2004 | Livingstone | 175/61 |
| 2004/0084182 A1 | 5/2004 | Edgar et al. | 166/285 |
| 2004/0099413 A1 | 5/2004 | Arceneaux | 166/173 |
| 2004/0104050 A1 | 6/2004 | Järvelä et al. | 175/57 |
| 2004/0104052 A1 | 6/2004 | Livingstone | 175/61 |
| 2004/0177962 A1 | 9/2004 | Bour | 166/285 |
| 2004/0231846 A1 | 11/2004 | Griffith et al. | |
| 2005/0061546 A1 | 3/2005 | Hannegan | 175/7 |
| 2005/0199390 A1 * | 9/2005 | Curtice et al. | 166/250.14 |
| 2006/0016599 A1 | 1/2006 | Badalamenti et al. | |
| 2006/0016600 A1 | 1/2006 | Badalamenti et al. | |
| 2006/0042798 A1 | 3/2006 | Badalamenti et al. | |
| 2006/0086499 A1 | 4/2006 | Badalamenti et al. | |
| 2006/0086503 A1 | 4/2006 | Reddy et al. | |
| 2006/0131018 A1 | 6/2006 | Rogers et al. | |

FOREIGN PATENT DOCUMENTS

| | | |
|---|---|---|
| GB | 2193741 | 2/1988 |
| GB | 2327442 A | 1/1999 |
| GB | 2348828 A | 10/2000 |
| RU | 1774986 | 11/1992 |
| RU | 1778274 | 11/1992 |
| RU | 1542143 C | 12/1994 |
| RU | 2067158 | 9/1996 |
| RU | 2 086 752 C1 | 8/1997 |
| SU | 1420139 A1 | 8/1988 |
| SU | 1716096 A1 | 2/1992 |
| SU | 1723309 A1 | 3/1992 |
| SU | 1758211 A1 | 8/1992 |
| WO | WO 2004/104366 | 12/2004 |
| WO | WO 2005/083229 A1 | 9/2005 |
| WO | WO 2006/008490 A1 | 1/2006 |
| WO | WO 2006/064184 A1 | 6/2006 |

OTHER PUBLICATIONS

Foreign Communication From a Related Counter Part Application, Oct. 12, 2005.

Foreign Communication From a Related Counter Part Application, Dec. 7, 2005.

Foreign Communication From a Related Counter Part Application, Sep. 30, 2005.

Halliburton Brochure Entitled "Bentonite (Halliburton Gel) Viscosifier", 1999.

Halliburton Brochure Entitled "Cal-Seal 60 Cement Accelerator", 1999.

Halliburton Brochure Entitled "Diacel D Lightweight Cement Additive", 1999.
Halliburton Brochure Entitled "Cementing Flex-Plug® OBM Lost-Circulation Material", 2004.
Halliburton Brochure Entitled "Cementing FlexPlug® W Lost-Circulation Material", 2004.
Halliburton Brochure Entitled "Gilsonite Lost-Circulation Additive", 1999.
Halliburton Brochure Entitled "Micro Fly Ash Cement Component", 1999.
Halliburton Brochure Entitled "Silicalite Cement Additive", 1999.
Halliburton Brochure Entitled "Spherelite Cement Additive", 1999.
Halliburton Brochure Entitled "Increased Integrity With the StrataLock Stabilization System", 1998.
Halliburton Brochure Entitled "Perlite Cement Additive", 1999.
Halliburton Brochure Entitled "The PermSeal System Versatile, Cost-Effective Sealants for Conformance Applications", 2002.
Halliburton Brochure Entitled "Pozmix® A Cement Additive", 1999.
Foreign Communication From a Related Counter Part Application, Feb. 24, 2005.
R. Marquaire et al., "Primary Cementing By Reverse Circulation Solves Critical Problem in the North Hassi-Messaoud Field, Algeria", SPE 1111, Feb. 1966.
Foreign Communication From a Related Counter Part Application, Dec. 27, 2005.
Foreign Communication From a Related Counter Part Application, Feb. 23, 2006.
Foreign Communication From a Related Counter Part Application, Jan. 8, 2007.
Foreign Communication From a Related Counter Part Application, Jan. 17, 2007.
Griffith, et al., "Reverse Circulation of Cement on Primary Jobs Increases Cement Column Height Across Weak Formations," Society of Petroleum Engineers, SPE 25440, 315-319, Mar. 22-23, 1993.
Filippov, et al., "Expandable Tubular Solutions," Society of Petroleum Engineers, SPE 56500, Oct. 3-6, 1999.
Daigle, et al., "Expandable Tubulars: Field Examples of Application in Well Construction and Remediation," Society of Petroleum Engineers, SPE 62958, Oct. 1-4, 2000.
Carpenter, et al., "Remediating Sustained Casing Pressure by Forming a Downhole Annular Seal With Low-Melt-Point Eutectic Metal," IADC/SPE 87198, Mar. 2-4, 2004.
Halliburton Casing Sales Manual, Section 4, Cementing Plugs, pp. 4-29 and 4-30, Oct. 6, 1993.
G.L. Cales, "The Development and Applications of Solid Expandable Tubular Technology," Paper No. 2003-136, Petroleum Society's Canadian International Petroleum Conference, Jun. 10-12, 2003.
Gonzales, et al., "Increasing Effective Fracture Gradients by Managing Wellbore Temperatures," IADC/SPE 87217, Mar. 2-4, 2004.
Fryer, "Evaluation of the Effects of Multiples in Seismic Data From the Gulf Using Vertical Seismic Profiles," SPE 25540, 1993.
Griffith, "Monitoring Circulatable Hole With Real-Time Correction: Case Histories," SPE 29470, 1995.
Ravi, "Drill-Cutting Removal in a Horizontal Wellbore for Cementing," IADC/SPE 35081, 1996.
MacEachern, et al., "Advances in Tieback Cementing," IADC/SPE 79907, 2003.
Davies, et al., "Reverse Circulation of Primary Cementing Jobs—Evaluation and Case History," IADC/SPE 87197, Mar. 2-4, 2004.
Abstract No. XP-002283587, "Casing String Reverse Cemented Unit Enhance Efficiency Hollow Pusher Housing".
Abstract No. XP-002283586, "Reverse Cemented Casing String Reduce Effect Intermediate Layer Mix Cement Slurry Drill Mud Quality Lower Section Cement Lining".
Brochure, Enventure Global Technology, "Expandable-Tubular Technology," pp. 1-6, 1999.
Dupal, et al, "Solid Expandable Tubular Technology—A Year of Case Histories in the Drilling Environment," SPE/IADC 67770, Feb. 27-Mar. 1, 2001.
DeMong, et al., "Planning the Well Construction Process for the Use of Solid Expandable Casing," SPE/IADC 85303, Oct. 20-22, 2003.
Waddell, et al., "Installation of Solid Expandable Tubular Systems Through Milled Casing Windows," IADC/SPE 87208, Mar. 2-4, 2004.
DeMong, et al., "Breakthroughs Using Solid Expandable Tubulars to Construct Extended Reach Wells," IADC/SPE 87209, Mar. 2-4, 2004.
Escobar, et al., "Increasing Solid Expandable Tubular Technology Reliability in a Myriad of Downhole Environments," SPE 81094, Apr. 27-30, 2003.

* cited by examiner

CASING STRINGS AND METHODS OF USING SUCH STRINGS IN SUBTERRANEAN CEMENTING OPERATIONS

BACKGROUND OF THE INVENTION

The present invention relates to subterranean operations, and more particularly, to improved casing strings, and methods of using improved casing strings in subterranean operations.

During the drilling of a well bore in a subterranean formation, a drilling fluid may be circulated through a drill pipe and drill bit into the well bore, and subsequently flow upward through the well bore to the surface. The drilling fluid functions, inter alia, to cool the drill bit, lubricate the rotating drill pipe to prevent it from sticking to the walls of the well bore, prevent blowouts by providing hydrostatic pressure to counteract the sudden entrance into the well bore of high pressure formation fluids, and remove drilled cuttings from the well bore. While drilling fluids generally are not settable, e.g., they do not set into hard impermeable sealing masses when static, drilling fluids may increase in gel strength over time. Typically, after a well bore is drilled to a desired final depth, the drill pipe and drill bit are withdrawn from the well bore and the drilling fluid is left therein so as to, inter alia, provide hydrostatic pressure on permeable formations penetrated by the well bore, thereby preventing the flow of formation fluids into the well bore.

A common subsequent step in completing the well bore usually involves placing a pipe string, e.g., casing, into the well bore. Depending upon factors such as, inter alia, the depth of the well bore and any difficulties in placing the pipe string therein, the drilling fluid may remain relatively static in the well bore for an extended period of time, e.g., up to about 2 weeks. During that time, the drilling fluid may progressively increase in gel strength whereby portions of the drilling fluid in the well bore may become increasingly difficult to displace.

Upon placement of the pipe string in the well bore, primary cementing is typically performed whereby the pipe string disposed in the well bore is cemented by pumping a well fluid through the pipe string and into an annulus between the pipe string and the walls of the well bore, thereby displacing the drilling fluid in the annulus. However, if the drilling fluid has developed sufficient gel strength during its residence within the well bore, an operator may be unable to displace all of the drilling fluid with the well fluid. Accordingly, portions of the drilling fluid in the well bore may be bypassed by the well fluid. This is problematic because the drilling fluid generally is not settable; therefore, formation fluids may enter and flow along the well bore, which is highly undesirable.

Operators have attempted to solve this problem by developing settable spotting fluid compositions, inter alia, to displace drilling fluids from well bores promptly after their use. However, these methods often have been problematic. Conventional settable spotting fluids may include blast furnace slag and other hydraulic components that may begin to set at relatively low temperatures, e.g., temperatures less than about 90° F. Also, certain slag-containing settable spotting fluids may be intolerant to contaminants that may be present in the well bore, causing the settable spotting fluids to set prematurely upon contact with well cement. Oftentimes a set retarder may be added to the settable spotting fluid, which may counteract the tendency to prematurely set, but which may enhance the difficulty in predicting the time when the settable spotting fluid will set.

SUMMARY OF THE INVENTION

The present invention relates to subterranean operations, and more particularly, to improved casing strings, and methods of using improved casing strings in subterranean operations.

An example of a method of the present invention is a method of cementing a pipe string in a subterranean formation, comprising: providing a well bore having a first fluid disposed therein; placing a second fluid into the well bore so as to displace at least a portion of the first fluid therefrom, the second fluid comprising a hydraulic cement, a set retarder, and an invert emulsion of oil, water, and an emulsifying agent; placing in the well bore a pipe string having an activator disposed on an outer surface thereof; permitting the second fluid and the activator to contact each other; and permitting the second fluid to set in the well bore.

Another example of a method of the present invention is a method of cementing a pipe string in a subterranean formation, comprising: providing a well bore having a first fluid disposed therein; placing a second fluid into the well bore so as to displace at least a portion of the first fluid therefrom, the second fluid comprising a hydraulic settable component, a gel strength inhibiting agent, a set retarder, and a water source; providing a pipe string having an activator disposed on an outer surface thereof; placing the pipe string in the well bore; permitting the second fluid and the activator to contact each other; and permitting the second fluid to set in the well bore.

Another example of a method of the present invention is a method of cementing a pipe string in a well bore, comprising: placing a well fluid into the well bore; placing in the well bore a pipe string having a cement-composition-activator and a well-fluid-activator disposed on an outer surface thereof; placing a cement composition in the well bore; permitting the cement composition and the cement-composition-activator to contact each other; permitting the well fluid and the well-fluid-activator to contact each other; permitting the cement composition to set in the well bore; and permitting the well fluid to set in the well bore.

An example of an apparatus of the present invention is an improved pipe string comprising: at least one pipe section; and a delivery system of an activator; wherein the delivery system of an activator is disposed adjacent an outer surface of the at least one pipe section.

The features and advantages of the present invention will be readily apparent to those skilled in the art upon a reading of the description of embodiments, which follows.

BRIEF DESCRIPTION OF THE DRAWINGS

A more complete understanding of the present disclosure and advantages thereof may be acquired by referring to the following description taken in conjunction with the accompanying drawings, wherein.

While the present invention is susceptible to various modifications and alternative forms, specific embodiments thereof have been shown in the drawings and are herein described. It should be understood, however, that the description herein of specific embodiments does not limit the invention to the particular forms disclosed, but on the contrary, covers all modifications, equivalents, and alternatives falling within the spirit and scope of the invention as defined by the appended claims.

DETAILED DESCRIPTION OF EMBODIMENTS

The present invention relates to subterranean operations, and more particularly, to improved casing strings, and methods of using improved casing strings in subterranean operations.

A. The Subterranean Fluids Useful With Certain Embodiments of the Present Invention A wide variety of fluids may be useful with the methods of the present invention. In certain embodiments of the present invention, subterranean well fluids comprising invert emulsions may be used. In certain embodiments of the present invention, aqueous-based settable spotting fluids may be used. One of ordinary skill in the art, with the benefit of this disclosure, will be able to identify a suitable fluid for use in the methods of the present invention.

1. Subterranean Well Fluids Comprising Invert Emulsions

Certain embodiments of the subterranean well fluids useful with the methods of the present invention generally comprise a hydraulic cement, a set retarder, and an invert emulsion that comprises oil, water, and an emulsifying agent. Other additives suitable for use in subterranean formations also may be added to these subterranean well fluids, if desired. In certain embodiments of the present invention, an invert emulsion may be present in a subterranean well fluid of the present invention in an amount in the range of from about 20% to about 60% by weight of the subterranean well fluid. In certain embodiments of the present invention, an invert emulsion may be present in a subterranean well fluid in an amount in the range of from about 30% to about 55% by weight. In certain embodiments of the present invention, the subterranean well fluids useful with the methods of the present invention have a density in the range of from about 11 to about 17 pounds per gallon. Examples of suitable subterranean well fluids comprising invert emulsions that may be suitable for use with the methods of the present invention include, but are not limited to, those described in U.S. Pat. Nos. 6,524,384; 6,666,268; 6,668,929; and 6,716,282, the relevant disclosures of which are hereby incorporated herein by reference.

Any cementitious material suitable for use in subterranean applications are suitable for use in the present invention. In certain embodiments, the subterranean well fluids used in the present invention comprise a hydraulic cement. A variety of hydraulic cements are suitable for use including those comprising calcium, aluminum, silicon, oxygen, and/or sulfur, which can set and harden by reaction with water. Such hydraulic cements include, but are not limited to, Portland cements, pozzolanic cements, gypsum cements, high alumina content cements, silica cements, and high alkalinity cements. Cementitious material comprising shale or blast furnace slag, fly ashes, and fumed silica also may be suitable for use in the present invention. In certain embodiments, the shale may comprise vitrified shale; in certain other embodiments, the shale may comprise raw, unfired shale, or a mixture of raw shale and vitrified shale.

Any suitable oil may be used in the invert emulsions in some embodiments of the subterranean well fluids useful with the methods of the present invention. In certain embodiments, suitable oils may comprise one or more long chain hydrocarbons. In certain embodiments, suitable oils may include synthetic oils such as, inter alia, esters. A particularly suitable mixture of long chain hydrocarbons is commercially available under the trade designation "ESCAID 110™" from the ExxonMobil Corporation. Generally, an oil is present in a subterranean well fluid of the present invention in an amount in the range of from about 40% to about 70% by volume of the invert emulsion. In certain embodiments, an oil is present in a subterranean well fluid of the present invention in an amount in the range of from about 45% to about 55% by volume of the invert emulsion.

Water sources used in the invert emulsions of some of the embodiments of the subterranean well fluids useful with the methods of the present invention may include, inter alia, fresh water, salt water (e.g., water containing one or more salts dissolved therein), brine (e.g., saturated salt water), or seawater. Generally, any water source may be suitable provided that it does not contain an excess of compounds that may adversely affect other components in the subterranean well fluid. One of ordinary skill in the art, with the benefit of this disclosure, will be able to recognize compounds that may adversely affect other components in the subterranean well fluid. In certain embodiments of the present invention, a suitable water source may be present in a subterranean well fluid of the present invention in an amount in the range of from about 30% to about 60% by volume of the invert emulsion. In certain embodiments, a suitable water source may be present in a subterranean well fluid of the present invention in an amount in the range of from about 45% to about 55% by volume of the invert emulsion.

A wide variety of emulsifying agents may be used to form the invert emulsions useful in some embodiments of the subterranean well fluids useful with the methods of the present invention. For example, suitable emulsifying surfactants may include, inter alia, tall oil diethanolamides, and a blend of oxidized tall oil fatty acids. In certain embodiments of the present invention, a suitable emulsifying surfactant may comprise a tall oil diethanolamide of the formula $RCON(CH_2CH_2OH)_2$, wherein R is a $C_{18}$ to $C_{20}$ alkyl radical; such emulsifying surfactant is commercially available under the trade designation "AMIDEX™" from Chemron Corporation of Paso Robles, Calif. In certain embodiments of the present invention, a suitable emulsifying surfactant may comprise a blend of oxidized tall oil fatty acids that is commercially available under the trade designation "OTO™ MOD™ #4" from Expo Chemical Co. Inc., of Houston, Tex. In certain embodiments of the present invention, a tall oil diethanolamide emulsifying surfactant may be present in the invert emulsion in an amount in the range of from about 2.3% to about 7.5% by weight of the emulsion. In certain embodiments of the present invention, an emulsifying surfactant comprising a blend of oxidized tall oil fatty acids may be present in the invert emulsion in an amount in the range of from about 1% to about 1.6% by weight of the oil in the invert emulsion.

The subterranean well fluids used in the present invention comprise a set retarder. A broad variety of set retarders may be suitable for use in the subterranean well fluids useful in the present invention. For example, the set retarder may comprise, inter alia, phosphonic acid, phosphonic acid derivatives, lignosulfonates, salts, organic acids, carboxymethylated hydroxyethylated celluloses, synthetic co- or terpolymers comprising sulfonate and carboxylic acid groups, borate compounds, derivatives thereof, or mixtures thereof. In certain embodiments, the set retarders used in the subterranean well fluids useful in the present invention are phosphonic acid derivatives, such as those described in U.S. Pat. No. 4,676,832, the relevant disclosure of which is hereby incorporated herein. Examples of suitable set retarders include, inter alia, phosphonic acid derivatives that are commercially available from Solutia Corporation of St. Louis, Mo. under the trade name "DEQUEST." Another example of a suitable set retarder is a phosphonic acid derivative commercially available from Halliburton Energy Services, Inc., of Duncan, Okla., under the trade name "MICRO MATRIX CEMENT RETARDER." Examples of suitable borate compounds include, but are not limited to, sodium tetraborate and potassium pentaborate. A commercially available example of a suitable set retarder comprising potassium pentaborate is available from Halliburton Energy Services, Inc. under the trade name "Component R." Examples of suitable organic acids include, inter alia, gluconic acid, citric acid, and tartaric acid. An example of a suitable organic acid is commercially available from Halliburton Energy Services, Inc. under the trade name "HR® 25." Other examples of suitable set retarders are commercially available from Halliburton Energy Services, Inc. under the trade names "SCR-100" and "SCR-500." Generally, the set retarder is present in the subterranean well fluids used in the present invention in an amount sufficient to delay the setting of the subterranean well fluids in a subterranean formation for a desired time. More particularly, the set retarder may be present in the subterranean well fluids used in the present invention in an amount in the range of from about 0.1% to about 10% by weight of the cementitious material ("bwoc"). In certain embodiments, the set retarder is present in the subterranean well fluids used in the present invention in an amount in the range of from about 0.5% to about 4% bwoc. One of ordinary skill in the art, with the benefit of this disclosure, will be able to recognize the appropriate amount of set retarder to include in a subterranean well fluid for a particular application.

Optionally, the subterranean well fluids used in the present invention also may include other additives, including defoamers, bactericides, dispersants, density-reducing additives, surfactants, weighting materials, viscosifiers, fly ash, silica, and the like. An example of a suitable defoaming agent is commercially available from Halliburton Energy Services, Inc., of Duncan, Okla., under the trade name "D-AIR™ 3000 L." An example of a suitable viscosifier is a biopolymer commercially available from Kelco Oilfield Group of Houston, Tex., under the trade name "BIOZAN®." An example of a suitable dispersant is commercially available from Halliburton Energy Services, Inc., of Duncan, Okla., under the trade name "CFR-3." An example of a suitable bactericide is commercially available from Halliburton Energy Services, Inc., of Duncan, Okla., under the trade name "BE-6." Any suitable additive may be incorporated within the subterranean well fluids used in the present invention. One of ordinary skill in the art with the benefit of this disclosure will be able to recognize a particular additive that may be suitable for a particular application.

2. Aqueous-Based Settable Spotting Fluids

A broad variety of aqueous-based settable spotting fluids may be useful in certain embodiments of the methods of the present invention. An example of a suitable aqueous-based settable spotting fluid is described in U.S. Pat. No. 6,138,759, the relevant disclosure of which is hereby incorporated by reference. Such aqueous-based settable spotting fluid comprises a hydraulic settable component (e.g., ASTM Class C or equivalent fly ash, or Class F or equivalent fly ash along with a calcium source (e.g., lime)), a gel strength inhibiting agent, a set retarder, and a water source. Certain embodiments of such aqueous-based settable spotting fluids optionally may comprise a fluid loss control additive. In certain embodiments of such aqueous-based settable spotting fluid that comprise Class F or equivalent fly ash along with a calcium source, lime generally is mixed with the Class F or equivalent fly ash in an amount in the range of from about 0.01% to about 25% by weight of the Class F or equivalent fly ash. Suitable gel strength inhibiting additives include, inter alia, copolymers and copolymer salts of N,N-dimethylacrylamide and 2-acrylamido-2-methylpropanesulfonic acid, which are further described in U.S. Pat. No. 4,555,269, the relevant disclosure of which is hereby incorporated herein by reference. Suitable gel strength inhibiting additives may be included in the aqueous-based settable spotting fluids in an amount in the range of from about 0.1% to about 1% by weight of the hydraulic settable component; in certain embodiments, the gel strength inhibiting additives may be included in the aqueous-based settable spotting fluids in an amount in the range of from about 0.4% to about 0.75% by weight of the hydraulic settable component. Suitable set retarders include, inter alia, metal salts of a sulfoalkylated lignin, including, but not limited to, the ammonium, alkali metal, alkaline earth metal, or other metal salts. Such suitable set retarders are further described in U.S. Pat. No. Re 31,190, the relevant disclosure of which is hereby incorporated herein by reference. In certain embodiments, the set retarder may be a calcium salt of a sulfomethylated lignin. Suitable set retarders may be present in the aqueous-based settable spotting fluids in an amount in the range of from about 0.1% to about 2% by weight of the hydraulic settable component.

B. Activators and Activator-Encapsulants Useful With Certain Embodiments of the Present Invention In certain embodiments of the methods of the present invention, the subterranean well fluids and aqueous-based settable spotting fluids useful in the present invention are permitted to remain in a slurry state for a desired time before being activated through the addition of an activator that is present on an outer surface of an improved casing string of the present invention.

1. Suitable Activators

Examples of suitable activators include, but are not limited to: amine compounds; and salts comprising calcium, sodium, magnesium, aluminum, or a mixture thereof. An example of a suitable calcium salt is calcium chloride. Examples of suitable sodium salts are sodium chloride, sodium silicate, and sodium aluminate. An example of a suitable magnesium salt is magnesium chloride. Examples of suitable amine compounds are triethanol amine, tripropanol amine, tri-isopropanol amine, and diethanol amine.

In certain embodiments of the present invention where the subterranean well fluids and aqueous-based settable spotting fluids are desired to set shortly after contacting an activator, the amount of activator generally required is an amount that is sufficient to cause the subterranean well fluids and aqueous-based settable spotting fluids to set within a time in the range of from about 1 minute to about 5 minutes after contacting the activator. In certain other embodiments of the present invention, including, but not limited to, embodiments wherein a cement composition may be placed in the well bore so as to displace at least a portion of the subterranean well fluids and aqueous-based settable spotting fluids therefrom, the amount of activator that may be required is an amount that is sufficient to cause the subterranean well fluids and aqueous-based settable spotting fluids to set within a time in the range of from about 1 hour to about 24 hours, or more, after contacting the activator. Generally, the activator may be added to the subterranean well fluids and aqueous-based settable spotting fluids used with the present invention in an amount in the range of from about 0.1% to about 8% bwoc. In certain embodiments, the activator may be added to the subterranean well fluids and aqueous-based settable spotting fluids used with the present invention in an amount in the range of from about 1% to about 4% bwoc.

In certain embodiments of the present invention wherein aqueous-based settable spotting fluids are used, a component of the aqueous-based settable spotting fluid (e.g., a calcium source such as lime) may be selected as an "initiator." As referred to herein, the term "initiator" will be understood to mean a component whose presence in an aqueous-based settable spotting fluid is required to cause setting of such aqueous-based settable spotting fluid. Examples of initiators that may be suitable for use include, inter alia, lime. In these embodiments of the present invention, the component selected as the initiator intentionally will be withheld from the aqueous-based settable spotting fluid during its formulation, which may result in the formulation of an aqueous-based settable spotting fluid that cannot set until contacted with the initiator. In certain of these embodiments, the initiator component then may be disposed along an outer surface of an improved casing string of the present invention.

Among other things, disposing an activator or an initiator along an outer surface of an improved casing string of the present invention may further reduce the possibility that the subterranean well fluids and aqueous-based settable spotting fluids used in the methods of the present invention will set undesirably before casing is introduced into the well bore, even in circumstances where the subterranean well fluids and aqueous-based settable spotting fluids are static in the well bore for an extended period of time. This is because, inter alia, the subterranean well fluids and aqueous-based settable spotting fluids used in the methods of the present invention generally require contact with an activator or initiator in order to set, and such contact will not occur in the methods of the present invention until an improved casing string of the present invention (comprising an activator or initiator disposed on an outer surface thereof) is placed in the well bore.

2. Suitable Activator-Encapsulants

In certain embodiments, the activator may comprise an outer coating that is dissolved by a compound that is only present within the subterranean well fluids and aqueous-based settable spotting fluids, and not in the subterranean formation or any other fluid that may contact the casing string in the subterranean formation. Examples of suitable activator-encapsulants that may be dissolved or degraded by the elevated pH of the subterranean well fluids and aqueous-based settable spotting fluids include, inter alia, thermoplastic materials that comprise base-hydrolyzable functional groups (e.g., esters, amides, and anhydride groups). Examples of suitable thermoplastic materials include, inter alia, polyesters (e.g., polyethylene terephthalate), 3-hydroxybutyrate/3-hydroxyvalerate copolymer, polymers comprising lactic acid or glycolic acid, polycaprolactone, polyethylene succinate, polybutylene succinate, poly(ethylene vinylacetate), poly(vinylacetate), polymers comprising dioxanone, cellulose esters, oxidized-ethylene-carbon-monoxide polymers, polyglycine, polycaprolactam, poly(gamma-glutamic acid), polyurethanes, polymers comprising bisphenol-A, polyamides (e.g., nylon 6/6), and the like. An example of a suitable polyester is commercially available from Union Carbide Corporation under the trade name "TONE." In certain embodiments, the activator-encapsulant may comprise latex compositions comprising crosslinkers that may be spray-dried onto the activator and may become crosslinked during the process, and that may swell and become porous upon exposure to fluids having an elevated pH. In certain embodiments of the present invention wherein an encapsulated activator may be applied to the outer side of a casing string by attaching base-degradable plastic bags containing the activator to the outer side of the casing string, the base-degradable plastic bags may be made from any of the abovementioned thermoplastic materials that comprise base-hydrolyzable functional groups.

Examples of suitable activator-encapsulants that may be dissolved or degraded by a compound that may be present in the subterranean well fluids and aqueous-based settable spotting fluids (e.g., an oxidizer that may be included, for example, as a peroxy salt), include, inter alia, polymers that comprise oxidizable monomers (e.g., butadiene). Examples of suitable polymers that comprise butadiene include, inter alia, styrene-butadiene copolymers, butadiene acrylonitrile copolymers, and the like. In certain embodiments wherein the activator-encapsulant comprises an oxidizable monomer, suitable oxidizers that may be added to the cement composition may include, inter alia, sodium or potassium persulfate, sodium perborate, sodium peroxide, sodium hypochlorite, sodium chlorite, and the like.

3. Activation By Heat

Optionally, the subterranean well fluids and aqueous-based settable spotting fluids may be activated by heat that may be induced within the subterranean formation. In certain of these optional embodiments, the activator may be present on the outer circumference of the pipe string to be cemented in the formation, and heat may be induced within the subterranean formation through the use of ultrasonic energy, radio waves, or an electrical current that may be generated within the subterranean formation. Examples of tools that may be suitable for generating heat in the subterranean formation include, inter alia, an induction-heating tool that is described in IADC/SPE 87198, the relevant disclosure of which is hereby incorporated by reference. In certain embodiments, heat may be generated in the subterranean formation through the use of a down hole choke, as described in IADC/SPE 87217, the relevant disclosure of which is hereby incorporated by reference.

4. A Sample Calculation Illustrating the Determination of a Suitable Concentration of Activator On the Outside of a Casing String In certain embodiments wherein an activator is present on the outer circumference of a casing string that may be placed in a subterranean formation, the amount of activator that may be applied to the casing string may be determined as illustrated in the following example:

In this hypothetical example, a mixture of Class F fly ash and lime (5% by weight) is mixed with 4.59 gallons of sea water per sack of Class F fly ash (equal to about 43% by weight of fly ash), to provide a composition having a density of 13.8 pounds per gallon and a yield of 1.13 ft$^3$/sack.

For purposes of this hypothetical example, an activator concentration of 1.0% by weight of fly ash is desired. Given that a sack of Class F fly ash is known to weigh about 74 pounds, the activator must be present on the outer circumference of the casing string in an amount sufficient to deliver 0.74 pounds of activator per sack of cement.

For purposes of this hypothetical example, assume that the outer diameter of the casing string is 13 3/8 inches, and that the annulus (between the walls of the formation and the casing string's outer diameter) has a diameter of 17 1/2 inches. The unit volume of this annulus may be calculated to be 1.4396 linear feet per cubic foot of volume.

Accordingly, 1 sack of Class F fly ash yielding 1.13 ft$^3$ of slurry per sack would fill 1.62675 feet of annular space. Because the desired activator concentration, expressed in pounds per sack, was determined above to be 0.74 pounds of activator per sack, the mass of activator required per foot of casing string is equal to (0.74 pounds per sack)/(1.62675 feet of casing string per sack), which equals 0.45489 pounds of activator per foot of casing string.

C. Some Methods of the Present Invention

Figure 1:
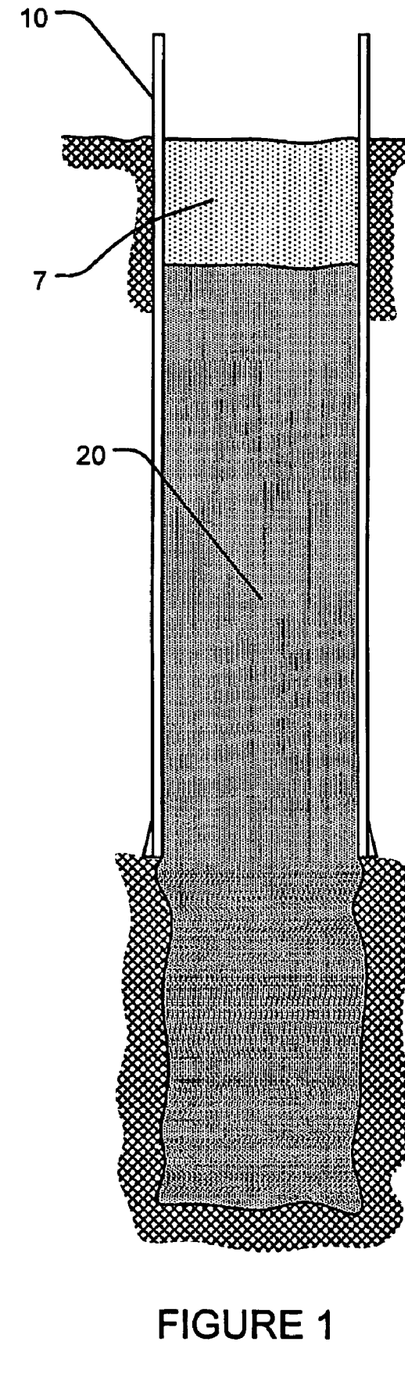
FIG. 1 illustrates a cross sectional side view of a well bore.
Figure 2:
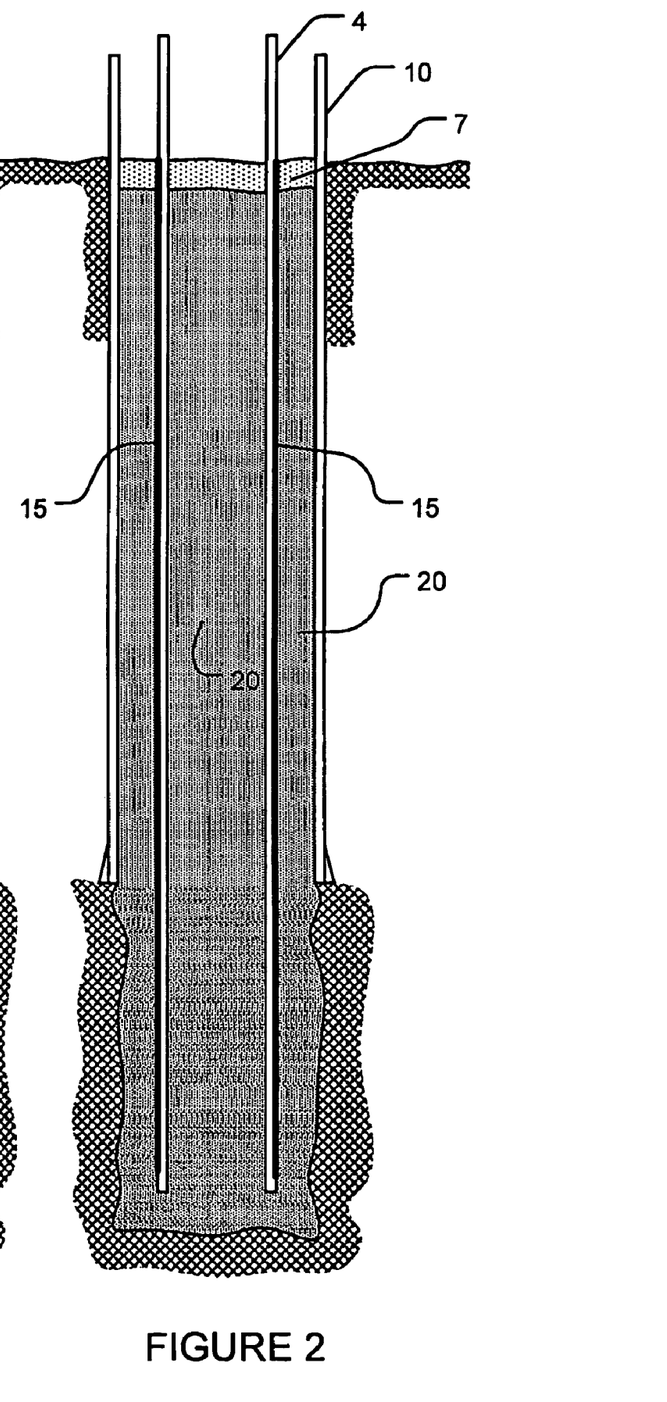
FIG. 2 illustrates a cross sectional side view of the well bore of FIG. 1.

In FIG. 1, fluid 7 and fluid 20 are shown disposed within well bore 10. Fluid 7 generally will comprise a drilling fluid that has been placed in a well bore, e.g., that has been used to drill well bore 10, and that was present in well bore 10 before the placement of fluid 20 therein. Fluid 20 generally is a fluid that has been placed in well bore 10 subsequent to fluid 7, and fluid 20 may comprise, inter alia, a subterranean well fluid comprising an invert emulsion, or an aqueous-based settable spotting fluid, examples of both of which previously have been described herein. In FIG. 2, casing 4 is placed within well bore 10, which displaces a portion of fluid 7 from well bore 10. Activator 15 generally is disposed on an outer surface of casing 4. Activator 15 generally is chosen so that fluid 20 will set within the subterranean formation at a desired time after contacting activator 15.

Activator 15 may be placed on the outer surface of casing 4 in a variety of ways. For example, activator 15 may be sprayed onto the outer surface of a section of casing 4 while the section resides in, e.g., a pipe rack. In certain of such embodiments, activator 15 may be a solid particle that becomes embedded in the outer surface of casing 4 as a result of a spraying process, or activator 15 may be part of a liquid that dries on the outside of casing 4. In certain of such embodiments, activator 15 may be mixed with an adhesive compound before being sprayed onto the outer surface of casing 4. Examples of suitable adhesives may include, inter alia: a variety of latexes (e.g., latexes that are styrene-butadiene-based, acrylate-based, acrylonitrile-based, and vinylacetate-based) comprising appropriate crosslinkers; phenolic resins comprising curing agents; adhesive formulations comprising polyvinylacetate; and the like. In another embodiment, activator 15 may be affixed to one side of a substrate (e.g., double-sided tape) that is attached to the outer surface of casing 4. For example, a first side of a supply of double-sided tape may be rolled in a suitable activator 15, then a second side may be affixed to the outer surface of casing 4.

In certain alternative embodiments of the invention, activator 15 may be applied to the exterior of the casing, and a suitable activator-encapsulant then may be applied over activator 15. In certain of these embodiments, the activator-encapsulant may be dissolved or degraded by either the elevated pH of a well fluid, or by a compound present in the well fluid (e.g., an oxidizer present in the well fluid) that is capable of dissolving or degrading the activator-encapsulant, to thereby expose activator 15. In certain embodiments of the present invention wherein activator 15 is encapsulated by a suitable activator-encapsulant, activator 15 may be applied to the outer side of casing 4 by any suitable method, including, for example, by attaching base-degradable plastic bags containing activator 15 to the outer side of the casing string. Examples of suitable base-degradable materials previously have been described in greater detail herein.

Figure 3A:
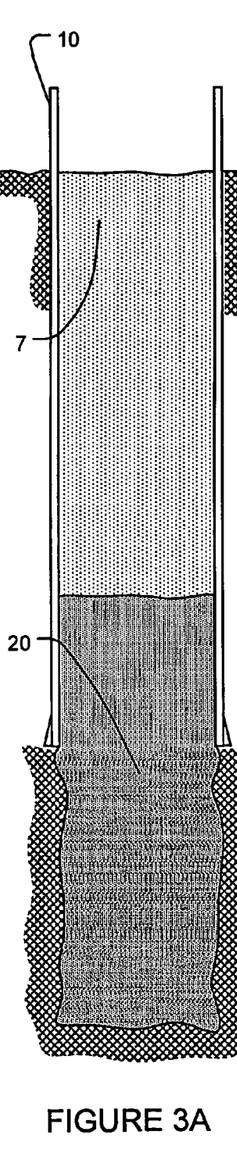
FIG. 3A illustrates a cross sectional side view of a well bore.
Figures 3B, 3C:
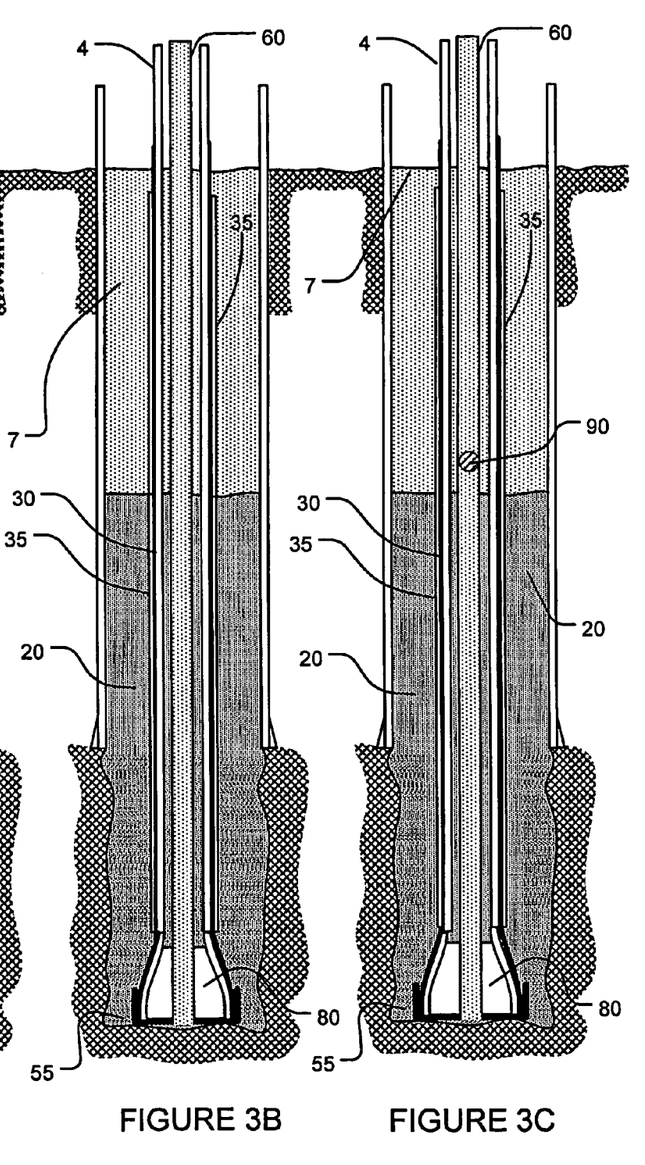
FIG. 3B illustrates a cross sectional side view of the well bore shown in FIG. 3A.
FIGS. 3C-3E illustrate cross sectional side views of the well bore shown in FIGS. 3A and 3B.
Figures 3D, 3E:
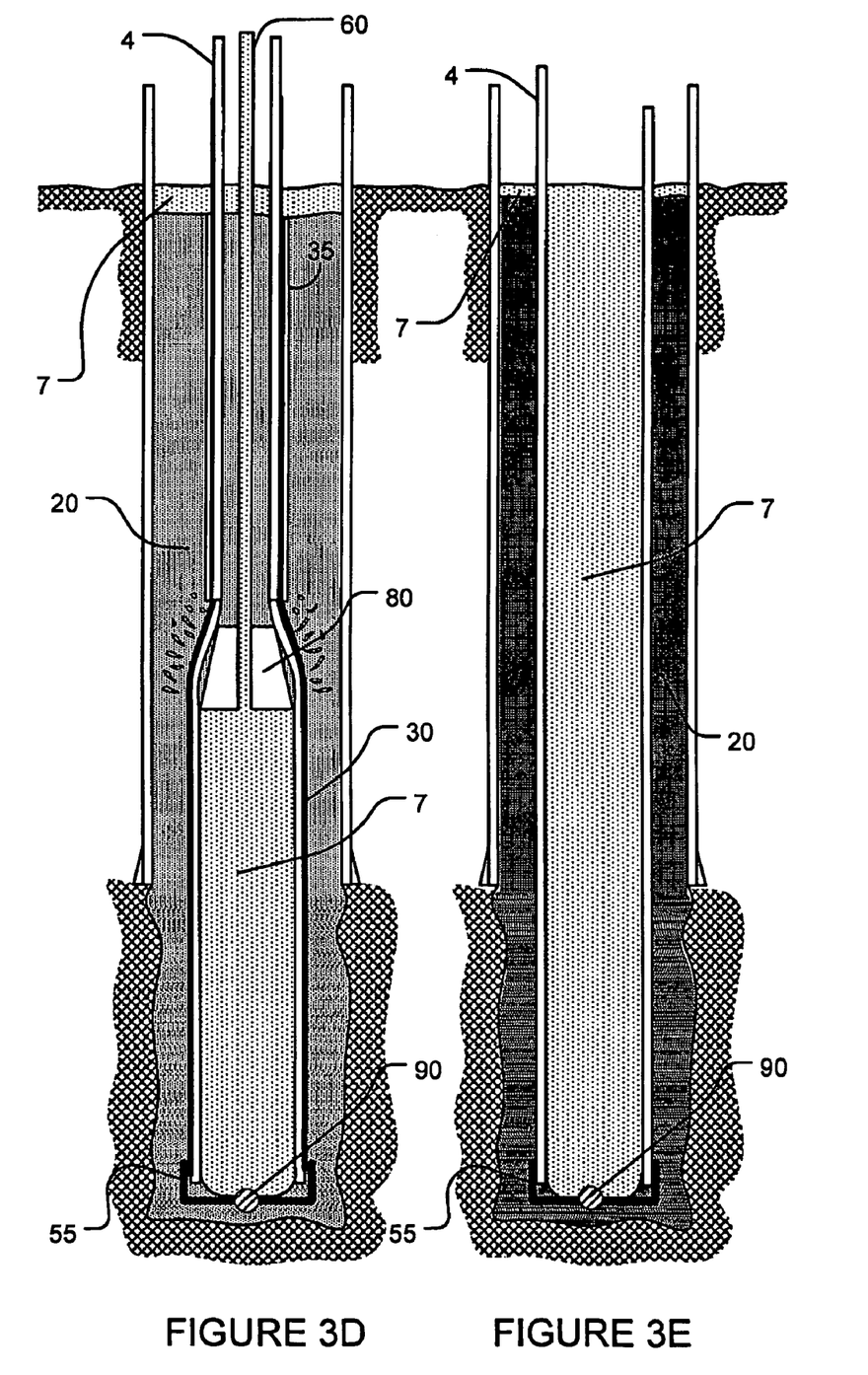

FIGS. 3A-3E illustrate cross-sectional side views of a well bore 10. FIG. 3A illustrates well bore 10 comprising fluid 7 and fluid 20 disposed therein. In certain embodiments of the present invention, fluid 7 may have been used to drill well bore 10, and fluid 20 may have been placed in the subterranean formation shortly after the drilling of the well bore 10, thereby displacing at least a portion of fluid 7 therefrom. As illustrated in FIGS. 3B-3E, in certain embodiments of the present invention, a casing string may be used that comprises an expandable tubular that may be expanded (e.g., by means known in the art), which may fracture or degrade activator-encapsulant 35, thereby permitting contact between activator 30 and fluid 20. Suitable expandable tubulars are commercially available from, inter alia, Enventure Global Technology, Inc., of Houston, Tex. Expandable tubulars are further described in, inter alia, CINC Paper 2003-136, "The Development and Applications of Solid Expandable Tubular Technology," by G. L. Cales, the relevant disclosure of which is hereby incorporated by reference. In certain embodiments of the present invention wherein a casing string is used that comprises an expandable tubular, after placement of fluid 20 in well bore 10, casing string 4 and drilling string 60 may be placed in well bore 10, and lowered to a desired depth therein, as illustrated in FIG. 3B, thereby displacing a portion of fluid 7 from well bore 10. Generally, casing string 4 comprises activator 15 on an outer surface thereof. In certain embodiments of the present invention, activator 15 will be encapsulated in a suitable activator-encapsulant 35. Casing string 4 further may comprise casing shoe 55, disposed at a lower end of casing string 4. Casing shoe 55 further may comprise a pig launcher (not shown), within which expansion pig 80 may be disposed. As illustrated in FIG. 3C, in certain embodiments of the present invention, a ball 90 may be dropped through drilling string 60, so as to seat within casing shoe 55, and cause a seal. Pressure then may be applied to the inside diameter of casing string 4, to thereby cause expansion pig 80 to be separated from the pig launcher (e.g., by shearing frangible attachments (not shown) that may attach expansion pig 80 to the pig launcher). As illustrated in FIG. 3D, a fluid (e.g., fluid 7 or another suitable fluid) may be pumped through drilling string 60 to thereby drive expansion pig 80 upwards through casing string 4 in a manner that expands casing string 4 to a desired degree. In certain embodiments of the present invention, the fluid that is pumped through drilling string 60 may comprise a drilling fluid that further comprises a lubricant that may facilitate reducing friction between expansion pig 80 and the inside diameter of casing string 4. Casing string 4 may be deformed sufficient to degrade activator-encapsulant 35, thereby exposing activator 30 to fluid 20. FIG. 3E illustrates well bore 10 comprising expanded casing string 4, with fluid 20 disposed in an annulus between the outer diameter of expanded casing string 4 and the walls of well bore 10, fluid 20 having set at a desired time after contact with activator 30.

Figures 4A, 4B:
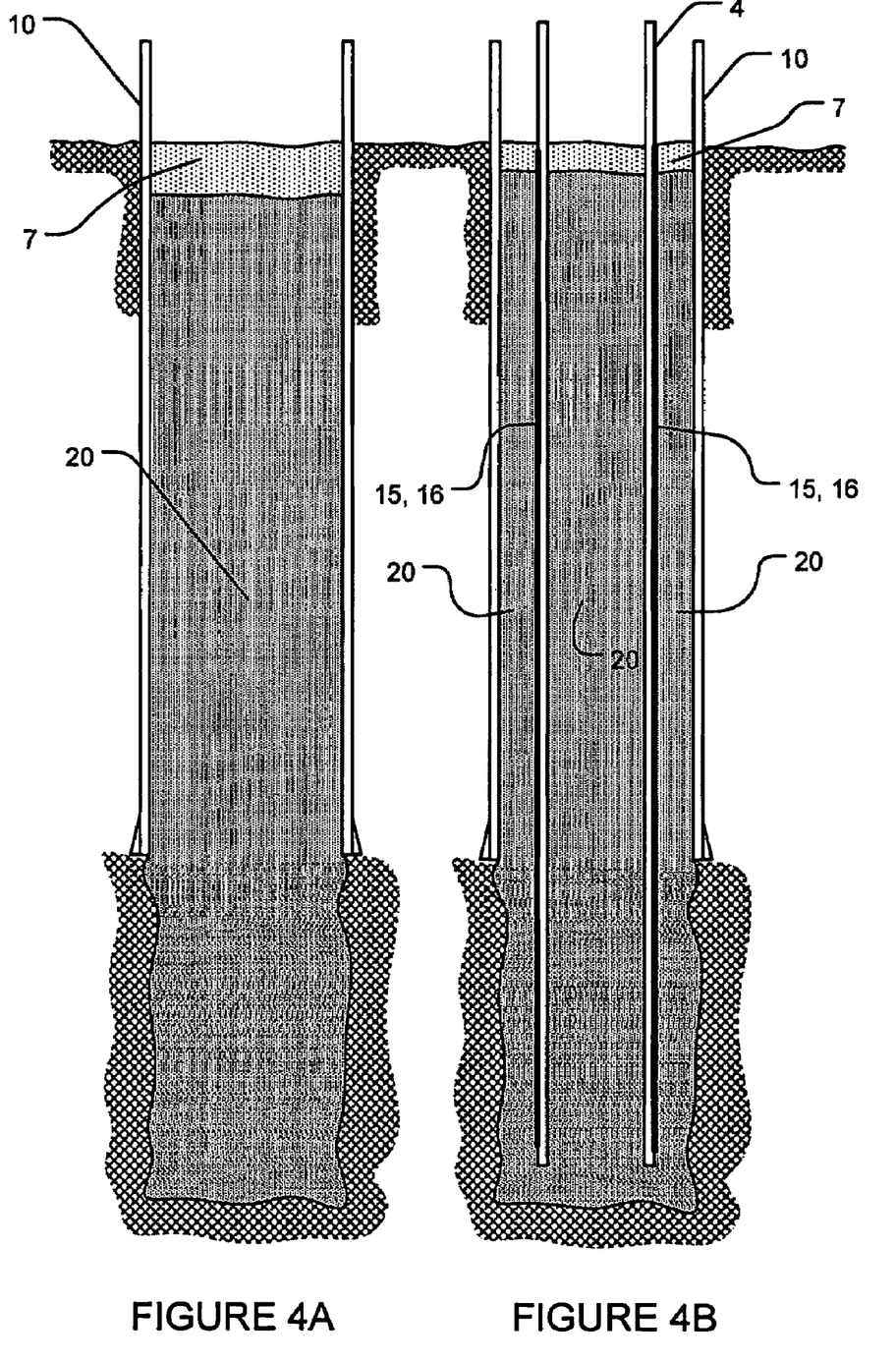
FIG. 4A illustrates a cross sectional side view of a well bore.
FIG. 4B illustrates a cross sectional side view of the well bore shown in FIG. 4A.
Figures 4C, 4D:
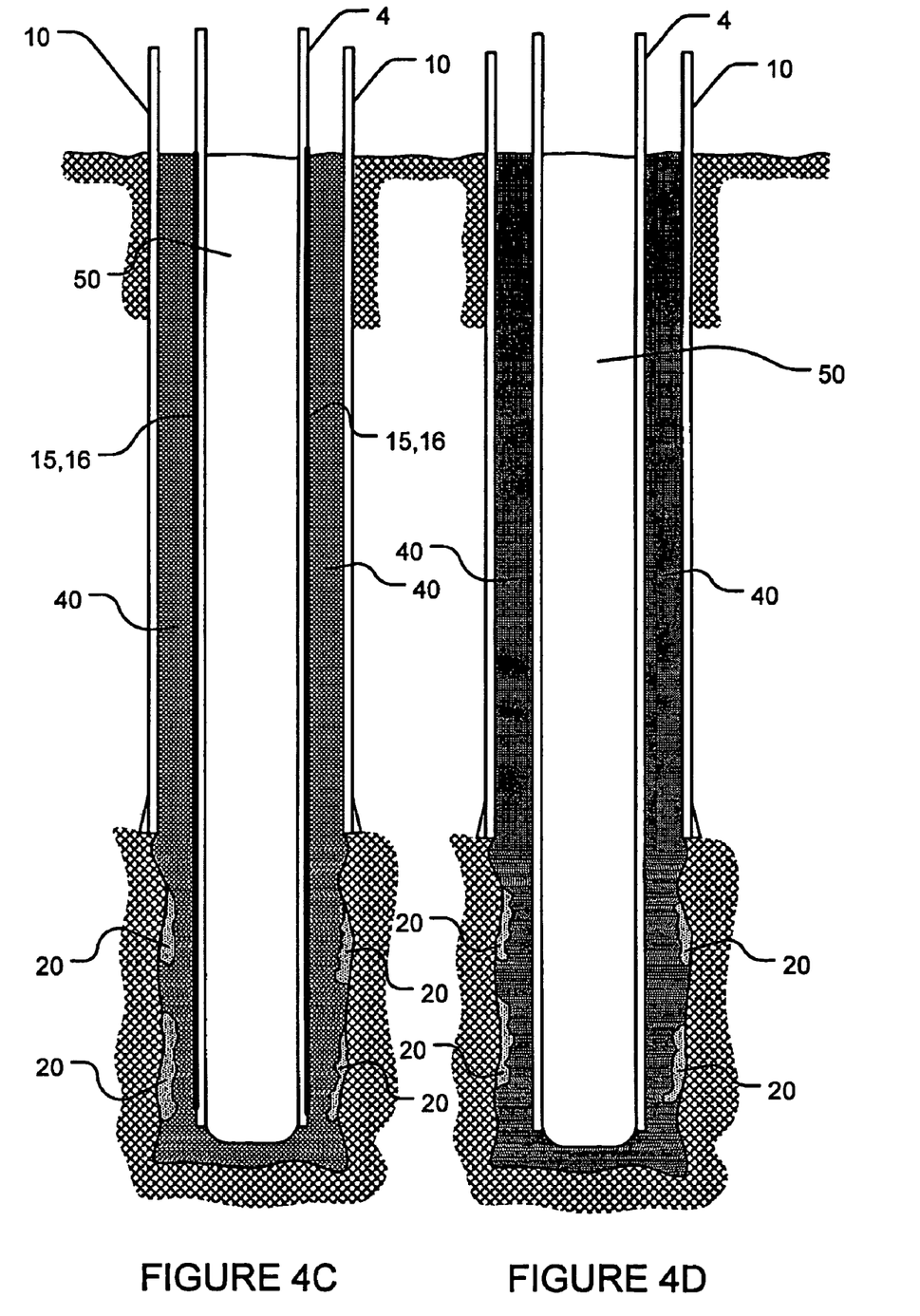
FIG. 4C illustrates a cross sectional side view of the well bore shown in FIGS. 4A and 4B.
FIG. 4D illustrates a cross sectional side view of the well bore shown in FIGS. 4A-4C.

FIG. 4A illustrates a cross-sectional side view of well bore 10 comprising a fluid 20 and a fluid 7. Fluid 7 generally will comprise a drilling fluid that has been placed in a well bore, e.g., that has been used to drill well bore 10, and that was present in well bore 10 before the placement of fluid 20 therein. Fluid 20 generally is a fluid that has been placed in well bore 10 subsequent to fluid 7. Fluid 20 generally comprises a subterranean well fluid comprising an invert emulsion, or an aqueous-based settable spotting fluid, suitable examples of which previously have been described herein. FIG. 4B illustrates the placement of casing 4 in well bore 10, thereby displacing a portion of fluid 7 therefrom. Casing 4 comprises activators 15 and 16 on an outer surface thereof. Activator 15 is an activator suitable for activating fluid 20, such that fluid 20 will set in well bore 10 at a desired time after contact with activator 15; examples of activators suitable for use as activator 15 previously have been described herein. Activator 16 is an activator suitable for activating a cement composition 40 (shown in FIG. 4C), such that cement composition 40 will set in well bore 10 at a desired time after contact with activator 16. Generally, activators 15 and 16 are formulated so that cement composition 40 will set in well bore 10 before fluid 20. FIG. 4C illustrates well bore 10 after (i) the placement of cement composition 40 in well bore 10, in a manner sufficient to displace at least a portion of fluid 20 therefrom, and after (ii) the placement of clear fluid 50 within casing string 4, in a manner sufficient to displace cement composition 40 from within casing string 4 and into the annulus between the outer diameter of casing string 4 and the walls of well bore 10. Certain undisplaced portions of fluid 20 may remain in well bore 10. A broad variety of cement compositions may be suitable for use as cement composition 40. In certain embodiments of the present invention, cement composition 40 may comprise a hydraulic cement. In certain embodiments of the present invention, cement composition 40 further may comprise a set retarder. A broad variety of activators for activating cement compositions may be suitable for use as activator 16, including, but not limited to, triethanolamine, triisopropanolamine, tripropanolamine, and diethanolamine. A broad variety of fluids may be suitable for use as clear fluid 50, including, but not limited to, drilling fluids, and completion brines, and the like. FIG. 4D illustrates well bore 10 after cement composition 40, and the undisplaced portions of fluid 20, have set within the annulus between the outer diameter of casing string 4 and the walls of well bore 10.

An example of a method of the present invention is a method of cementing a pipe string in a subterranean formation, comprising: providing a well bore having a first fluid disposed therein; placing a second fluid into the well bore so as to displace at least a portion of the first fluid therefrom, the second fluid comprising a hydraulic cement, a set retarder, and an invert emulsion of oil, water, and an emulsifying agent; placing in the well bore a pipe string having an activator disposed on an outer surface thereof; permitting the second fluid and the activator to contact each other; and permitting the second fluid to set in the well bore.

Another example of a method of the present invention is a method of cementing a pipe string in a subterranean formation, comprising: providing a well bore having a first fluid disposed therein; placing a second fluid into the well bore so as to displace at least a portion of the first fluid therefrom, the second fluid comprising a hydraulic settable component, a gel strength inhibiting agent, a set retarder, and a water source; providing a pipe string having an activator disposed on an outer surface thereof; placing the pipe string in the well bore; permitting the second fluid and the activator to contact each other; and permitting the second fluid to set in the well bore.

Another example of a method of the present invention is a method of cementing a pipe string in a well bore, comprising: placing a well fluid into the well bore; placing in the well bore a pipe string having a cement-composition-activator and a well-fluid-activator disposed on an outer surface thereof; placing a cement composition in the well bore; permitting the cement composition and the cement-composition-activator to contact each other; permitting the well fluid and the well-fluid-activator to contact each other; permitting the cement composition to set in the well bore; and permitting the well fluid to set in the well bore.

An example of an apparatus of the present invention is an improved pipe string comprising: at least one pipe section; and a delivery system of an activator; wherein the delivery system of an activator is disposed adjacent an outer surface of the at least one pipe section.

Therefore, the present invention is well adapted to carry out the objects and attain the ends and advantages mentioned as well as those which are inherent therein. While the invention has been depicted and described by reference to embodiments of the invention, such a reference does not imply a limitation on the invention, and no such limitation is to be inferred. The invention is capable of considerable modification, alternation, and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A method of cementing a pipe string in a subterranean formation, comprising:

provyding a well bore having a first fluid disposed therein;

placing a second fluid into the well bore so as to displace at least a portion of the first fluid therefrom, the second fluid comprising a hydraulic settable component;

placing in the well bore a pipe string having at least one activator disposed adjacent an outer surface thereof;

permitting the second fluid and the activator to contact each other;

permitting the second fluid to set in the well bore; and placing a cement composition into the well bore to displace at least a portion of the second fluid therefrom, wherein placing a cement composition into the well bore to displace at least a portion of the second fluid therefrom is performed before permitting the second fluid to set in the well bore.

2. The method of claim 1 wherein the first fluid is a drilling fluid.

3. The method of claim 1 further comprising permitting the cement composition to set in the well bore, wherein permitting the cement composition to set in the well bore is performed before permitting the second fluid to set in the well bore.

4. The method of claim 1 wherein the second fluid further comprises an invert emulsion comprising oil, water, and an emulsifying agent and wherein the invert emulsion is present in the second fluid in an amount in the range of from about 20% to about 60% by weight of the second fluid.

5. The method of claim 4 wherein the water is present in the invert emulsion in an amount in the range of from about 30% to about 60% by volume of the invert emulsion.

6. The method of claim 4 wherein the emulsifying agent comprises a blend of oxidized tall oil fatty acids.

7. The method of claim 4 wherein the emulsifying agent comprises a tall oil diethanolamide.

8. The method of claim 1 wherein the hydraulic settable component is a hydraulic cement selected from the group consisting of a Portland cement, pozzolanic cement, gypsum cement, high alumina cement, silica cement, and a high alkalinity cement.

9. The method of claim 8 wherein the hydraulic cement comprises a component selected from shale and blast furnace slag.

10. The method of claim 1 wherein the second fluid further comprises a set retarder selected from the group consisting of a lignosulfonate, an organic acid, phosphonic acid, a phosphonic acid derivative, a salt, a carboxymethylated hydroxyethylated cellulose, a synthetic co- or terpolymer comprising sulfonate and carboxylic acid groups, and a borate compound.

11. The method of claim 10 wherein the borate compound is sodium tetraborate or potassium pentaborate.

12. The method of claim 10 wherein the set retarder is present in the second fluid in an amount in the range of from about 0.1% to about 10% by weight of the hydraulic cement.

13. The method of claim 1 wherein the second fluid further comprises a component selected from the group consisting of a surfactant, a dispersant, mica, fibers, a bactericide, a formation conditioning agent, a fixed-density weighting agent, fumed silica, bentonite, fly ash, a fluid loss control additive, an expanding additive, a defoamer, a viscosifier, hollow microspheres, and a mixture thereof.

14. The method of claim 1 wherein the activator is an amine compound.

15. The method of claim 14 wherein the amine compound is triethanol amine, diethanol amine, tripropanol amine, tri-isopropanol amine, or a mixture thereof.

16. The method of claim 1 wherein the activator is a salt of a material selected from the group consisting of: calcium, sodium, magnesium, and aluminum.

17. The method of claim 1 wherein the activator is calcium chloride, sodium chloride, sodium aluminate, sodium silicate, magnesium chloride, or a mixture thereof.

18. The method of claim 1 wherein providing a pipe string comprising an activator on an outer surface of the pipe string further comprises spraying the activator onto the outer surface of the pipe string, and permitting the activator to dry.

19. The method of claim 18 further comprising encapsulating the activator in an activator-encapsulant.

20. The method of claim 1 wherein providing a pipe string comprising an activator on an outer surface of the pipe string further comprises affixing the activator to a first side of a substrate having two sides, and affixing the second side of the substrate to the outer surface of the pipe string.

21. The method of claim 20 further comprising encapsulating the activator in an activator-encapsulant.

22. The method of claim 21 wherein the activator-encapsulant is selected from the group consisting of: a polyester; a 3-hydroxybutyrate/3-hydroxyvalerate copolymer; a polymer comprising lactic acid; a polymer comprising glycolic acid; a polycaprolactone; a polyethylene succinate; a polybutylene succinate; a poly(ethylene vinylacetate); a poly (vinylacetate); a polymer comprising dioxanone; a cellulose ester; an ethylene-carbon-monoxide polymer; polyglycine; polycaprolactam; poly(gamma-glutamic acid); a polyurethane; a polyamide; and a polymer comprising bisphenol-A.

23. The method of claim 21 wherein the activator-encapsulant comprises a latex composition comprising a crosslinker.

24. The method of claim 21 wherein the activator-encapsulant comprises a polymer comprising an oxidizable monomer.

25. The method of claim 24 wherein the oxidizable monomer is butadiene.

26. The method of claim 24 wherein the activator-encapsulant is a styrene-butadiene copolymer, or a butadiene acrylonitrile copolymer.

27. The method of claim 24 further comprising dissolving or degrading the activator-encapsulant by contacting the activator-encapsulant with an oxidizer.

28. The method of claim 27 wherein dissolving or degrading the activator-encapsulant by contacting the activator-encapsulant with an oxidizer is performed before permitting the second fluid and the activator to contact each other.

29. The method of claim 27 wherein the oxidizer is sodium persulfate, potassium persulfate, sodium perborate, sodium peroxide, sodium hypochlorite, or sodium chlorite.

30. The method of claim 1 further comprising encapsulating the activator in an activator-encapsulant, wherein the pipe string comprises an expandable tubular, and wherein permitting the second fluid and the activator to contact each other so as to cause the second fluid to set in the well bore comprises expanding the pipe string, whereby the activator-encapsulant is broken to expose the activator.

31. The method of claim 1 wherein the activator is an initiator.

32. The method of claim 1 wherein the activator is an initiator that comprises lime.

33. The method of claim 1 wherein the pipe string further comprises a second activator, wherein the second activator is a cement-composition-activator.

34. The method of claim 33 further comprising placing a cement composition into the well bore to displace at least a portion of the second fluid therefrom, wherein placing a cement composition into the well bore to displace at least a portion of the second fluid therefrom is performed before permitting the second fluid to set in the well bore, permitting the cement composition and the cement-composition-activator to contact each other; and permitting the cement composition to set in the well bore, wherein permitting the cement composition to set in the well bore is performed before permitting the second fluid to set in the well bore.

35. The method claim 1 wherein the second fluid further comprises a gel strength inhibiting agent, a set retarder, and a water source.

36. The method of claim 1 wherein the hydraulic settable component is ASTM Class C fly ash or ASTM Class F fly ash.

37. A method of cementing a pipe string in a subterranean formation, comprising:
  providing a well bore having a first fluid disposed therein;
  placing a second fluid into the well bore so as to displace at least a portion of the first fluid therefrom, the second fluid comprising a hydraulic settable component;
  placing in the well bore a pipe string having at least one activator encapsulated in an activator-encapsulant and disposed adjacent an outer surface thereof;
  permitting the second fluid and the activator to contact each other; and
  permitting the second fluid to set in the well bore;

wherein providing a pipe string comprising an activator on an outer surface of the pipe string further comprises affixing the activator to a first side of a substrate having two sides, and affixing the second side of the substrate to the outer surface of the pipe string; and wherein the activator-encapsulant comprises a thermoplastic material.

38. The method of claim 37 wherein the thermoplastic material comprises a base-hydrolyzable functional group.

39. The method of claim 38 wherein the base-hydrolyzable functional group is an ester, an amide, or an anhydride.

40. A method of cementing a pipe string in a subterranean formation, comprising:
provrding a well bore having a first fluid disposed therein;
placing a second fluid into the well bore so as to displace at least a portion of the first fluid therefrom, wherein the second fluid is a fluid comprising a hydraulic cement, a set retarder, and an invert emulsion comprising oil, water, and an emulsifying agent or a fluid comprising hydraulic settable component, a gel strength inhibiting agent, a set retarder, and a water source;
providing a pipe string having at least one activator disposed adjacent an outer surface thereof;
placing the pipe string in the well bore;
permitting the second fluid and the activator to contact each other;
permitting the second fluid to set in the well bore; and
placing a cement composition into the well bore to displace at least a portion of the second fluid therefrom, wherein placing a cement composition into the well bore to displace at least a portion of the second fluid therefrom is performed before permitting the second fluid to set in the well bore.

41. The method of claim 40 further comprising permitting the cement composition to set in the well bore, wherein permitting the cement composition to set in the well bore is performed before permitting the second fluid to set in the well bore.

42. The method of claim 40 wherein the hydraulic settable component is ASTM Class C fly ash or ASTM Class F fly ash.

43. The method of claim 40 wherein providing a pipe string comprising an activator on an outer surface of the pipe string further comprises spraying the activator onto the outer surface of the pipe string, and permitting the activator to dry.

44. The method of claim 43 further comprising encapsulating the activator in an activator-encapsulant.

45. The method of claim 40 wherein providing a pipe string comprising an activator on an outer surface of the pipe string further comprises affixing the activator to a first side of a substrate having two sides, and affixing the second side of the substrate to the outer surface of the pipe string.

46. The method of claim 45 further comprising encapsulating the activator in an activator-encapsulant.

47. The method of claim 46 further comprising dissolving or degrading the activator-encapsulant by contacting the activator-encapsulant with an oxidizer.

48. The method of claim 47 wherein dissolving or degrading the activator-encapsulant by contacting the activator-encapsulant with an oxidizer is performed before permitting the second fluid and the activator to contact each other.

49. The method of claim 47 wherein the oxidizer is sodium persulfate, potassium persulfate, sodium perborate, sodium peroxide, sodium hypochlorite, or sodium chlorite.

50. The method of claim 40, further comprising encapsulating the activator in a suitable activator-encapsulant, wherein the pipe string comprises an expandable tubular, and wherein permitting the second fluid and the activator to contact each other so as to cause the second fluid to set in the well bore comprises expanding the pipe string, whereby the activator-encapsulant is broken to expose the activator.

51. The method of claim 40 wherein the pipe string further comprises a second activator, wherein the second activator is a cement-composition-activator.

52. The method of claim 51 further comprising placing a cement composition into the well bore to displace at least a portion of the second fluid therefrom, wherein placing a cement composition into the well bore to displace at least a portion of the second fluid therefrom is performed before permitting the second fluid to set in the well bore, permitting the cement composition and the cement-composition-activator to contact each other; and permitting the cement composition to set in the well bore, wherein permitting the cement composition to set in the well bore is performed before permitting the second fluid to set in the well bore.

53. A method of cementing a pipe string in a well bore, comprising:
placing a well fluid comprising a hydraulic settable component into the well bore;
placing in the well bore a pipe string having a cement-composition-activator and a well-fluid-activator disposed on an outer surface thereof;
placing a cement composition in the well bore;
permitting the cement composition and the cement-composition-activator to contact each other;
permitting the well fluid and the well-fluid-activator to contact each other;
permitting the cement composition to set in the well bore; and
permitting the well fluid to set in the well bore.

54. The method of claim 53 wherein the well fluid further comprises a gel strength inhibiting agent, a set retarder, and a water source.

55. The method of claim 53 wherein the hydraulic settable component is ASTM Class C fly ash or ASTM Class F fly ash.

56. The method of claim 53 wherein the hydraulic settable component is hydraulic cement and wherein the well fluid further comprises a set retarder, and an invert emulsion comprising oil, water, and an emulsifying surfactant.

57. The method of claim 56 wherein the invert emulsion is present in the well fluid in an amount in the range of from about 20% to about 60% by weight of the well fluid.

58. The method of claim 56 wherein the water is present in the well fluid in an amount in the range of from about 30% to about 60% by volume of the invert emulsion.

59. The method of claim 56 wherein the hydraulic cement is selected from the group consisting of a Portland cement, pozzolanic cement, gypsum cement, high alumina cement, silica cements and a high alkalinity cement.

60. The method of claim 56 wherein the hydraulic cement comprises a component selected from the group consisting of shale and blast furnace slag.

61. The method of claim 56 wherein the set retarder is selected from the group consisting of a lignosulfonate, an organic acid, phosphonic acid, a phosphonic acid derivative, a salt, a carboxymethylated hydroxyethylated cellulose, a synthetic co- or ter-polymer comprising sulfonate and carboxylic acid groups, and a borate compound.

62. The method of claim 56 wherein the set retarder is sodium tetraborate or potassium pentaborate.

63. The method of claim 56 wherein the set retarder is present in the well fluid in an amount in the range of from about 0.1% to about 10% by weight of the hydraulic cement.

64. The method of claim 56 wherein the emulsifying surfactant comprises a blend of oxidized tall oil fatty acids.

65. The method of claim 56 wherein the emulsifying surfactant comprises a tall oil diethanolamide.

66. The method of claim 56 wherein the well fluid further comprises a component selected from the group consisting of a surfactant, a dispersant, mica, fibers, a bactericide, a formation conditioning agent, a fixed-density weighting agent, fumed silica, bentonite, fly ash, a fluid loss control additive, an expanding additive, a defoamer, a viscosifier, hollow microspheres, and a mixture thereof.

67. The method of claim 53 wherein the well-fluid-activator is an amine compound.

68. The method of claim 67 wherein the amine compound is triethanol amine, diethanol amine, tripropanol amine, tri-isopropanol amine, or a mixture thereof.

69. The method of claim 53 wherein the well-fluid-activator is a salt of a material selected from the group consisting of: calcium, sodium, magnesium, and aluminum.

70. The method of claim 53 wherein the well-fluid-activator is calcium chloride, sodium chloride, sodium aluminate, sodium silicate, magnesium chloride, or a mixture thereof.

71. The method of claim 53 wherein providing a pipe string comprising a well-fluid-activator and a cement-composition-activator on an outer surface of the pipe string further comprises spraying at least one of the well-fluid-activator and the cement-composition-activator onto the outer surface of the pipe string, and permitting the at least one of the well-fluid-activator and the cement-composition-activator to dry.

72. The method of claim 53 wherein providing a pipe string comprising a well-fluid-activator and a cement-composition-activator on an outer surface of the pipe string further comprises affixing at least one of the well-fluid-activator and the cement-composition-activator to a first side of a substrate having two sides, and affixing the second side of the substrate to the outer surface of the pipe string.

73. The method of claim 53, further comprising encapsulating the cement-composition-activator and the well-fluid-activator in an activator-encapsulant, wherein the pipe string comprises an expandable tubular, and wherein permitting the cement composition and the cement-composition-activator to contact each other and permitting the well fluid and the well-fluid-activator to contact each other comprises expanding the pipe string, whereby the activator-encapsulant is broken to expose the cement-composition-activator and the well-fluid-activator.

74. The method of claim 53 wherein the well-fluid-activator is an initiator.

75. The method of claim 53 wherein the well-fluid-activator is an initiator that comprises lime.

* * * * *